United States Patent [19]

Collin et al.

[11] 4,374,663
[45] Feb. 22, 1983

[54] METHOD AND APPARATUS FOR REDUCING AN IRON OXIDE MATERIAL IN A FLUIDIZED BED

[75] Inventors: Per H. Collin, Stocksund; Erik A. Bengtsson, Borlänge, both of Sweden

[73] Assignee: Stora Kopparbergs Bergslags AB, Falun, Sweden

[21] Appl. No.: 224,882

[22] Filed: Jan. 14, 1981

[30] Foreign Application Priority Data

Jan. 16, 1982 [SE] Sweden ................ 8000369

[51] Int. Cl.³ .......................................... C21B 13/02
[52] U.S. Cl. .......................................... 75/26; 75/34; 266/172; 422/146
[58] Field of Search ............... 266/172, 189; 75/26, 75/34, 35; 422/146

[56] References Cited

U.S. PATENT DOCUMENTS

| 720,490 | 2/1903 | Ruthenburg | 75/26 |
| 4,073,642 | 2/1978 | Collin et al. | 75/26 |

FOREIGN PATENT DOCUMENTS

| 2356487 | 5/1975 | Fed. Rep. of Germany . |
| 2539444 | 3/1976 | Fed. Rep. of Germany . |
| 54-41571 | 2/1979 | Japan . |
| 36514 | 8/1923 | Norway . |
| 32374 | 11/1908 | Sweden . |
| 326158 | 8/1964 | Sweden . |
| 368720 | 10/1974 | Sweden . |
| 552443 | 4/1943 | United Kingdom . |
| 845310 | 8/1960 | United Kingdom . |
| 858813 | 1/1961 | United Kingdom . |
| 866646 | 4/1961 | United Kingdom ............ 75/34 |
| 1348920 | 4/1971 | United Kingdom . |
| 1340345 | 12/1973 | United Kingdom . |
| 1499260 | 7/1976 | United Kingdom . |
| 2039350 | 8/1980 | United Kingdom . |
| 113798 | 5/1953 | U.S.S.R. . |

Primary Examiner—M. J. Andrews
Attorney, Agent, or Firm—Curtis, Morris & Safford

[57] ABSTRACT

A method is suggested for the reduction of finely-divided iron oxide in a fluidized bed, with the air of reducing gases formed by partial combustion in the bed of finely-divided carbonaceous material by gas containing molecular oxygen, which is supplied through nozzles (4). The exterior surface of the nozzles is cooled to a temperature lower than 200° C below the melting point of the reduced metal. In this way the particles of the reduced iron are prevented from adhering to the nozzles.

8 Claims, 3 Drawing Figures

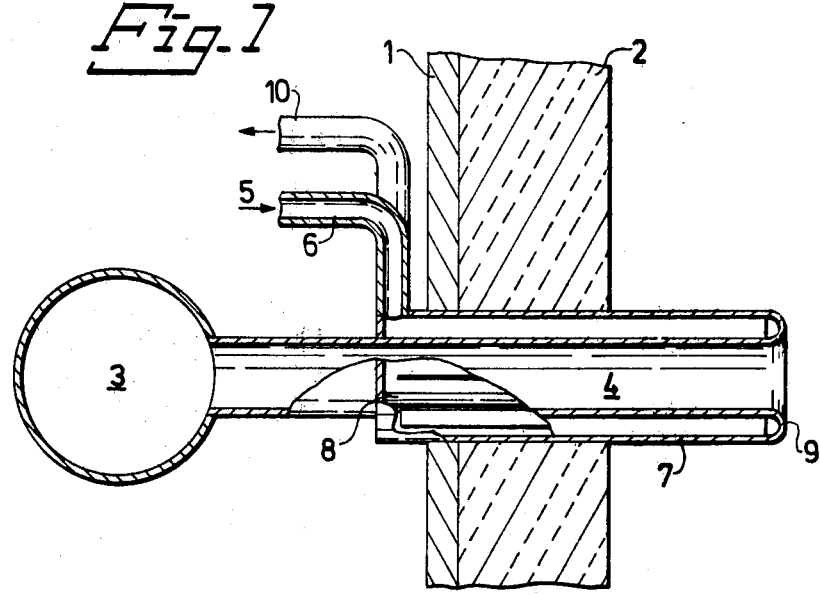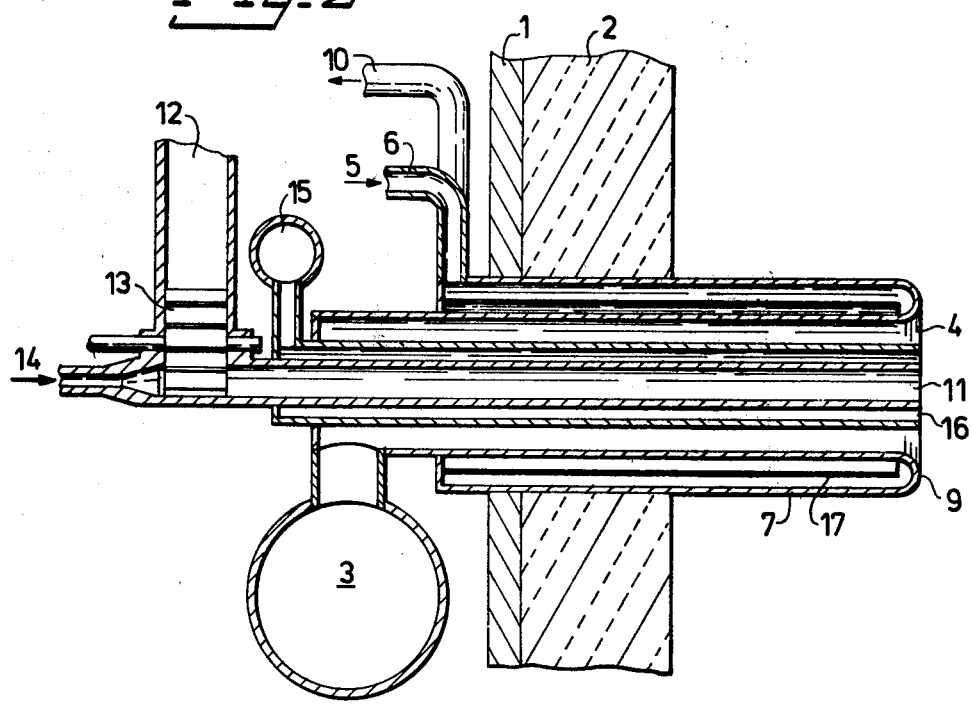

METHOD AND APPARATUS FOR REDUCING AN IRON OXIDE MATERIAL IN A FLUIDIZED BED

TECHNICAL FIELD

The present invention relates to a method and an apparatus for supplying gas contining molecular oxygen to a fluidized bed for reduction therein of finely-divided material substantially consisting of iron oxide, such as iron ore concentrate, using reducing gases formed by partial combustion in the bed of finely-divided carbonaceous material supplied thereto. The invention prevents the deposition of solid material of the bed which would otherwise occur owing to the stickiness of the solid material resulting from the supply of the gas containing molecular oxygen.

BACKGROUND ART

It is a well known fact that one of the reasons for the fluidized bed process having had a very limited application for reducing fine-grain iron oxide-containing material is the difficulty of avoiding stickiness in the bed at the high reaction temperatures required to give a satisfactory production rate. However, considerable progress has been made in this area lately. By ensuring that the fluidized beds contain an excess of fine-grain solid carbonaceous material preventing the reduced metal grains from sticking together, by using circulating fluidized beds (for the definition of such see L. Reh "Fluidized Bed Processing", Chemical Engineering Progress, Vol. 67, No. 2, February 1971, Pages 58–63), which give rapid blending of material supplied, and by suitably placed and formed nozzles for the supply of molecular oxygen-containing gas, it has been possible to reduce finely divided iron oxide-containing material, using reducing gases produced by partial combustion in the bed of finely-divided carbonaceous material with the aid of supplied molecular oxygen-containing gas, e.g. air. The nozzles have preferably extended into the fluidized bed at a distance equal to at least two times the diameter of the nozzles. In this way it has been possible to avoid the unfavourable effect of the low flow velocity close to the wall of the fluidized bed. In attempts to carry out such a reduction at an increased pressure (above 2 bar) it has been found, however, that certain stickiness problems occur at the nozzles. According to the Swedish patent specification No. 326,158 it is possible to prevent the agglomeration of pulverulent material in fluidized beds for drying and roasting processes by adding cooling air through an annular channel surrounding the nozzle for the supply of the hot fluidizing gas. This method has not, however, been able to prevent the sticking of pulverulent material to the nozzles and walls of fluidized beds for the reduction of materials containing iron oxide. It has been found that it is chiefly the iron oxide that sticks, which can be conceived as being caused by reduced metal being reoxidized and thereby heated up above the stickiness temperature. The reduced iron has a high heat of combustion. Therefore, cooling with air is not enough for cooling the outer surface of the nozzle to prevent the iron oxide from sticking to the nozzle. The sticky masses grow and disturb the bed function. They break off in portions and cause difficulties in other parts of the apparatus. Protective coatings on the nozzles or insulation thereof, have not been able to prevent this stickiness.

DISCLOSURE OF THE INVENTION

The present invention has been found able to master these difficulties, both for circulating beds and other fluidized beds, and is characterized in that the mouth and the outside of the nozzles for the supply of the gas containing moleculaar oxygen is cooled to a temperature lower than 200° C. below the melting point of the reduced iron. The nozzles should be cooled along a length which is at least two times the inner diameter of the opening of the nozzles. The nozzles are preferably cooled with water flowing through a cooling jacket surrounding the nozzle. The nozzles should extend into the fluidized bed a distance which is at least twice the inner diameter of the opening of the nozzle, meaning that the distance from the refractory lining of the fluidized bed reactor to the extreme end of the nozzle should be at least twice the inner diameter of the opening of the nozzle.

The method in accordance with the invention is suitably combined with the previously known steps for lessening stickiness. The content of solid finely-divided carbon in the bed is suitably kept at between 20 and 50% by weight, the carbon suitably constituting coke formed at the partial combustion of the supplied finely-divided carbonaceous material, which can be both solid, e.g. anthracite, coal or coke, or liquid fuel, e.g. fuel oil, heavy oil or other petroleum products.

The finely-divided carbonaceous material can, if desired, be supplied to the nozzles for the gas containing molecular oxygen, and in such case suitably through a centrally placed pipe in the nozzle. Since the gas containing the molecular oxygen is suitably pre-heated, this pipe may be surrounded by an annular duct, to which a cooling gas is supplied, by which means a too early decomposition of the carbonaceous material is avoided, and therewith deposits in the pipe are avoided. The partial combustion of the carbonaceous material takes place more slowly and does not give such hot reaction products as the reaction between the oxygen and the reduced metal. The risk of sticking around the nozzles is is also reduced in this way.

The invention is primarily intended for use in circulating fluidized beds with a pressure above 2 bars, preferably 2-15 bars, but may also be applied for lower pressures and even for conventional fluidized beds.

BRIEF DESCRIPTION OF DRAWINGS

FIG. 1 illustrates a nozzle in accordance with the invention, fixed into the wall of a fluidized bed reactor.

FIG. 2 illustrates a second nozzle in accordance with the invention, where fine-grain carbonaceous material is simultaneously supplied through the nozzle.

PREFERRED EMBODIMENT

Figure 3:
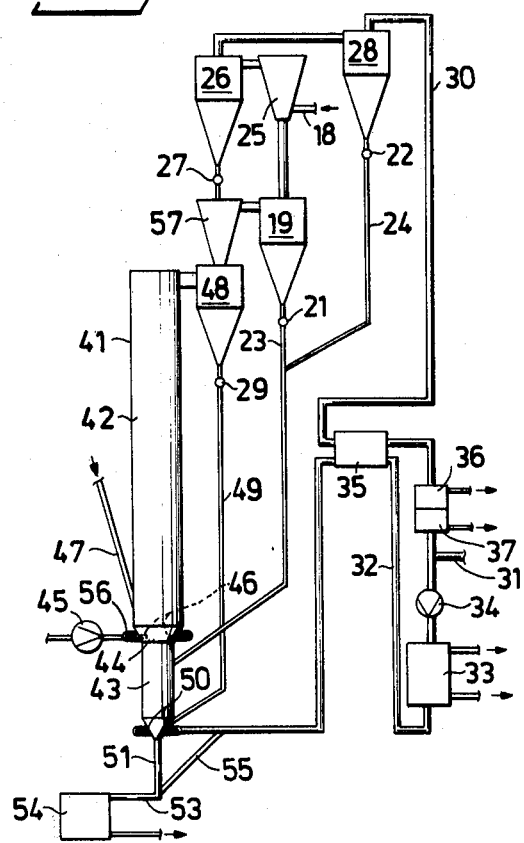
FIG. 3 illustrates an apparatus for carrying out the method of the invention.

FIG. 1 illustrates a nozzle in accordance with the invention fixed into a wall 1 of a fluidized bed reactor having a refractory lining 2. From a supply line 3, which can be, for example, an annular conduit surrounding the reactor, gas containing molecular oxygen, e.g. preheated air, flows through a pipe 4 into the reactor. Cooling medium 5, e.g. water, flows through a pipe 6 to a jacket 7 surrounding the gas supply pipe 4. There are cooling channels 8 in the jacket 7, arranged such that the whole jacket 7 and opening 9 are well cooled. The cooling medium is lead away via a pipe 10. The supply pipe 3, as well as the nozzle pipe 4 are suitably lined with refractory lining, whereby the cooling of the supplied gas containing molecular oxygen is reduced. The opening 9 of the nozzle is suitably at a distance interiorly of the lined wall 4,2, which is at least twice the diameter of the nozzle pipe 4.

FIG. 2 illustrates an embodiment where finely-divided carbonaceous material is supplied through a central pipe 11 in a nozzle for supplying gas containing molecular oxygen. The finely-divided carbonaceous material is here assumed to be in powder form, and is supplied via a conduit 12 and a sector feeder 13 to a stream of non-oxidizing gas supplied through a pipe 14, with which it is blown into the reaction chamber. A cooling gas, e.g. cold air may, if desired, be blown in from a supply pipe 15 through an annular gap 16 around the pipe supplying the fine-grain carbonaceous material. The cooling gas may be oxygen gas, if for some reason or another more oxygen gas needs to be supplied than there is in the gas containing the molecular oxygen, which is supplied via the supply pipe 3 and the gas supply pipe 4 in the nozzle. This oxygen gas will then primarily be consumed by combustion of the carbonaceous material, and the risk that reduced iron in the fluidized bed will come into contact with highly concentrated oxygen gas is lessened. In this figure there is illustrated another embodiment of the cooling jacket around the nozzle, which comprises two concentric channels separated by a concentric intermediate wall 17.

The nozzles in accordance with the invention can be placed at suitable places in the walls of a fluidized bed reactor. For example, they can be placed in a sloping surface, as is indicated in FIG. 3, or in a vertical wall as is shown in FIGS. 1 and 2.

FIG. 3 illustrates an apparatus containing a fluidized bed reactor operating with a circulating fluidized bed. The apparatus comprises a refractory-lined reactor 41 defining a vertically elongate upper reaction chamber 42, preferably cylindrical, and a lower reaction chamber 43, also preferably cylindrical. The height of the lower reaction chamber is ¼-1/6 of the total height of the upper reaction chamber, and it has a cross-sectional area which is only ⅓-½ of that of the upper reaction chamber. Between the upper and the lower reaction chamber there is a conical zone 44. Combustion air is supplied from a compressor 45 through an annular supply conduit 56 and nozzles 46 which extend into the reactor through the conical wall portion 44. The nozzles 46 may be of the type disclosed in FIG. 1 or FIG. 2. The nozzles extend from the inside face of the wall of the reactor and inwards thereof, and open out at a distance therefrom, which is at least equal to twice the inside diameter of the nozzles. The diameter of the nozzles must be sufficient for the combustion air blown in to be given an impulse or a momentum sufficient for rapidly mixing the air with the content in the reaction chamber. The direction of the nozzles can, if desired, deviate from the horizontal plane by at most 45° downwards or at most 80° upwards. Above the nozzles there are one or more delivery openings for carbonaceous powder supplied through a conduit 47. The upper reaction chamber 42 is connected to a refractory-lined main cyclone separator 48 for separating solid material in the departing gas. A conduit 49 goes from the cyclone separator 48 to recycle the solid material to the bottom of the lower reaction chamber 43. For the supply of reducing fluidizing gas there are nozzles 50 opening out in the bottom of the lower reaction chamber 43. A narrow tapping shaft 51 is also connected to said bottom, the shaft being downwardly connected via a fluidizing trap 53 with a cooling means 54 for cooling the tapped material. A branch pipe 55 extends from the main fluidizing gas conduit 32 to the lower portion of the tapping shaft 51. The gas thus flowing upwards through the shaft 51 prevents the discharged material from packing together in said shaft, and may also create a wind-separating effect in said shaft, so as to remove lighter carbon particles from the discharged material in the shaft 51.

The exhaust gas from the cyclone separator 48 is taken to a venturi preheater 57, in which it meets the ore concentrate which is fed in via a supply pipe 18 and a dust cyclone separator 19 connected in series to the ventury pre-heater 57, said cyclone separator 19 separating the ore concentrates from the departing gas and returning the dust to the lower reaction chamber 3 via a dust pipe 23, provided with a gas trap 21.

The ore concentrates which is preheated by the gas from the first dust cyclone separator 19 going to a second venturi preheater 25, to which the ore concentrate is fed through said supply pipe 18. The ore concentrate is separated from the gas in a second dust cyclone separator 26, and is discharged to the previously mentioned venturi preheater 57 via a gas trap 27. The exhaust gas is cleaned in an additional dust cyclone separator 28, from which dust is conveyed to the reactor through a dust pipe 24 containing a gas trap 22. The solid material from the main cyclone separator 48 passes through a gas trap 29 to the conduit 49. The gas traps 21, 22, 27, 29, which can be sluice valves or powder locks, let dust through but prevent gas from flowing up into the cyclone separators. The outlet conduit 30 from the last dust cyclone separator 28 extends through a heat exchanger 35 for reheating the reflux gas. The gas is conveyed through a cooler 36 and a dust separator 37, e.g. an electrofilter. Part of the gas is withdrawn through a conduit 31 for excess gas, and may be passed to a steam power electrical plant. The remaining gas is pumped by a gas compressor 34 to a washing apparatus 33 for removing $H_2O$ and $CO_2$ from the gas. The washed gas is conveyed via a conduit 32 through the heat exchanger 35, in which it is reheated, and is finally conveyed to the nozzles 50 in the bottom of the reactor portion 43.

As an example, the apparatus illustrated in FIG. 3 was equipped with nozzles 46 of the type illustrated in FIG. 2. The apparatus was used for the reduction of iron ore concentrates, using powdered coal as heating and reducing agent. It was found that the entire quantity of powdered coal could be added through the nozzles 46, viz. through the conduit 12, the feeder 13, and the central pipe 11. Consequently, there was no need for adding any coal through the supply pipe 47 illustrated in FIG. 3. Preheated air was supplied through the nozzles 46 at a rate required for producing the heat of reduction and for maintaining, by partial combustion of the coal a temperature of 970° C. in the reactor. The reduced iron consisted of an iron-carbon alloy having a melting point of approximately 1130° C. The nozzles 46 were cooled with water to a temperature well below 930° C.

We claim:

1. A method for the reduction of finely-divided iron oxide material in a fluidized bed reactor by means of reducing gases formed at the partial combustion of finely-divided carbonaceous material in the fluidized bed by a gas containing molecular oxygen, said gas being supplied to the fluidized bed through nozzles extending into the fluidized bed a distance at least twice the diameter of the nozzle, comprising: cooling the opening and the exterior surface of the nozzles to a temperature lower than 200° C. below the melting point of the reduced metal, the nozzles being thus cooled along a distance from their opening which is at least twice the inside diameter of the opening, by means of a coolant flowing through a cooling jacket.

2. A method as claimed in claim 1, in which the nozzles are cooled by means of water.

3. A method as claimed in claim 1, and wherein the reduction of the metal takes place at an increased pressure from 2 bars and above.

4. Method as claimed in claim 1 and wherein, characterized in that the fluidized bed contains finely-divided solid carbonaceous material, preferably to a content of 20–50 percent by weight.

5. Method as claimed in claim 1 and wherein, characterized in that finely-divided solid or liquid carbonaceous material is supplied to the bed in an amount such that the carbon content therein is kept constant.

6. Method as claimed in claim 1 and wherein, characterized in that the gas containing molecular oxygen consists of pre-heated air.

7. Method as claimed in claim 1 and wherein, characterized in that the fluidized bed is a circulating fluidized bed.

8. Method as claimed in claim 1 and wherein, characterized in that finely-divided carbonaceous material is supplied via a supply pipe placed centrally in one or more of the nozzles.

* * * * *

UNITED STATES PATENT OFFICE
CERTIFICATE OF CORRECTION

Patent No. 4,374,563   Dated February 22, 1983

Inventor(s) Collin et al.

It is certified that error appears in the above-identified patent and that said Letters Patent are hereby corrected as shown below:

On the title page, Item [30], the date "Jan. 16, 1982" should be -- Jan. 16, 1980 --.

Signed and Sealed this

Third Day of May 1983

[SEAL]

Attest:

GERALD J. MOSSINGHOFF

Attesting Officer   Commissioner of Patents and Trademarks